Figure 1:
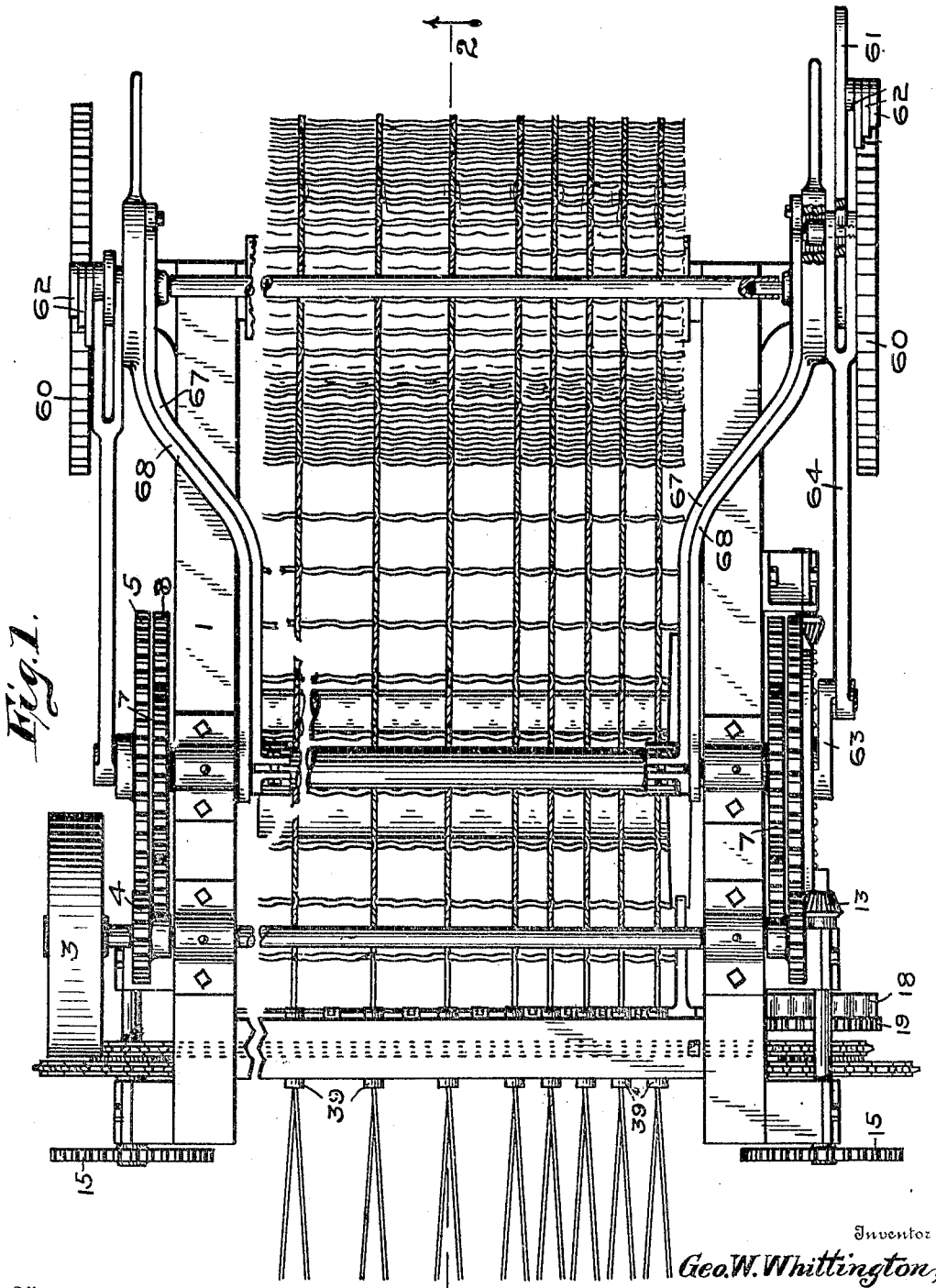

No. 801,950. PATENTED OCT. 17, 1905.
G. W. WHITTINGTON.
FENCE WEAVING MACHINE.
APPLICATION FILED JUNE 17, 1904.

4 SHEETS—SHEET 1.

Witnesses
Geo. P. A. Weisenborn,
F. W. Woerner.

Inventor
Geo. W. Whittington,
By Joseph A. Minturn
Attorney

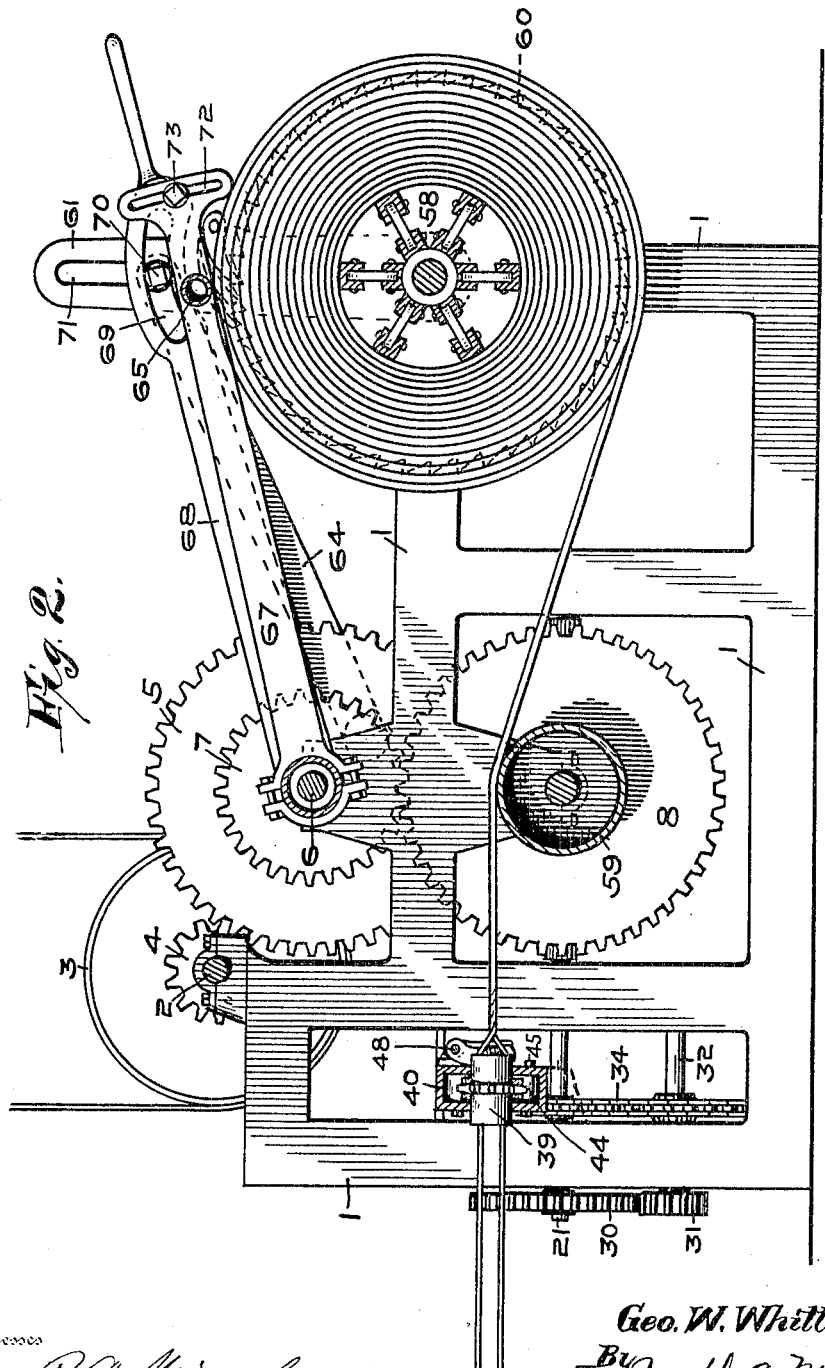

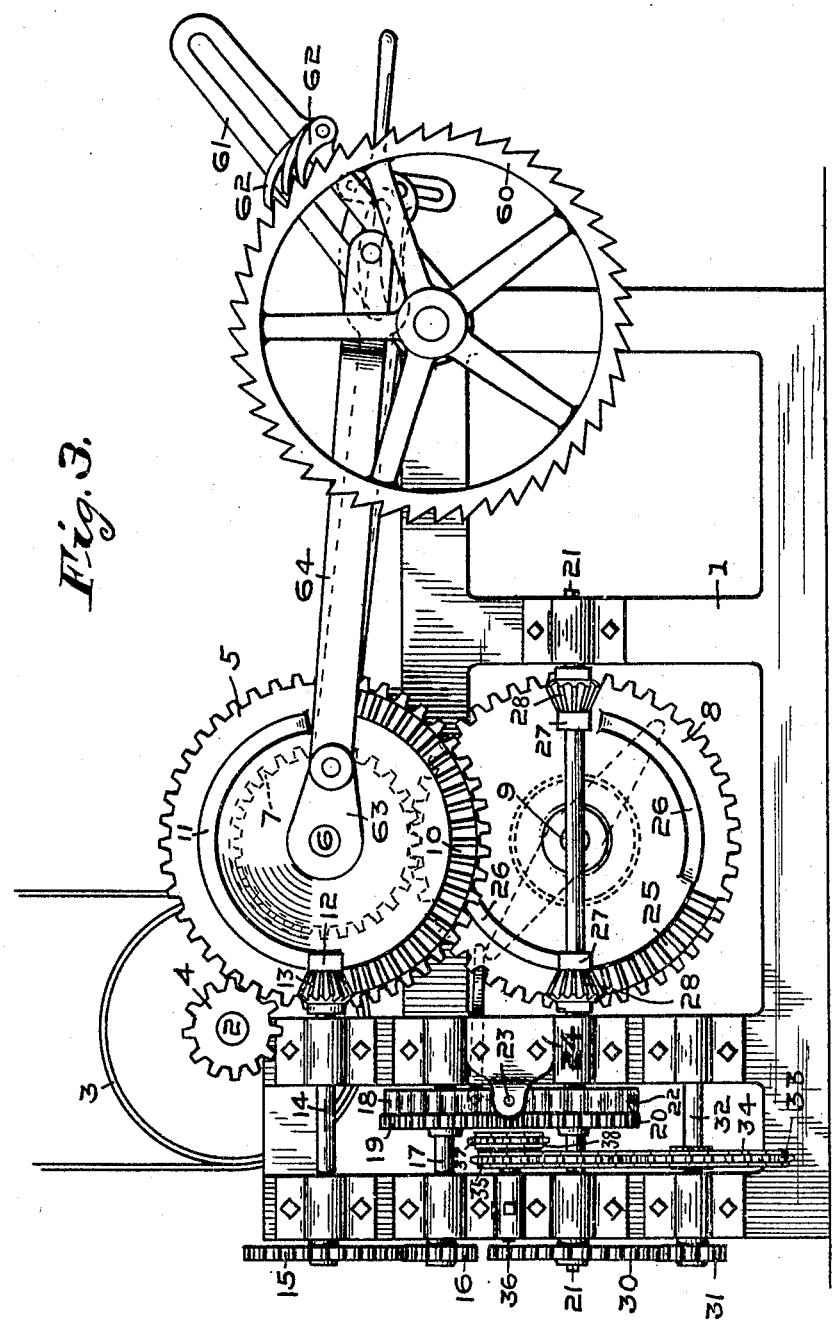

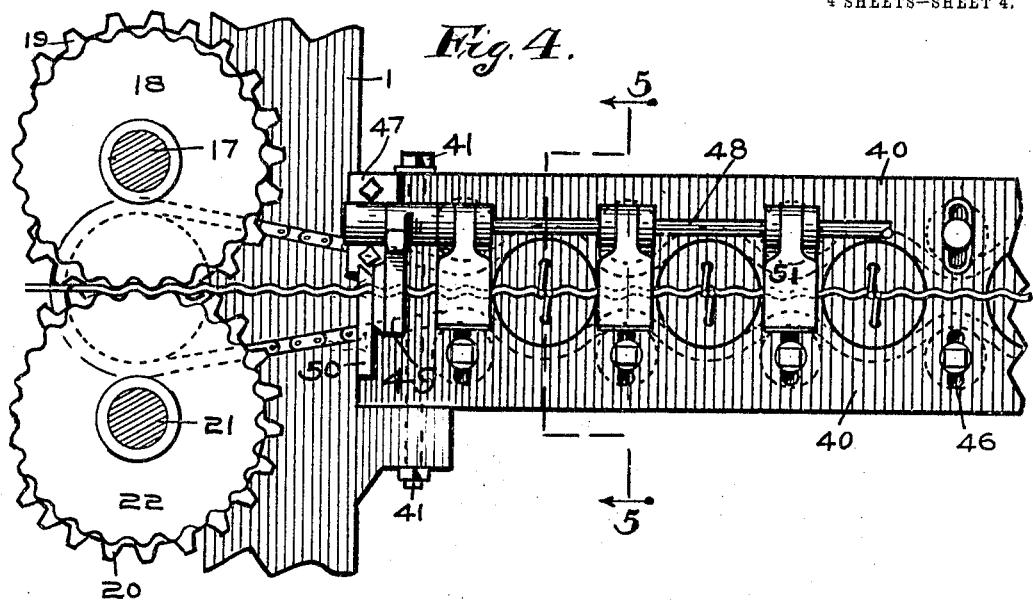
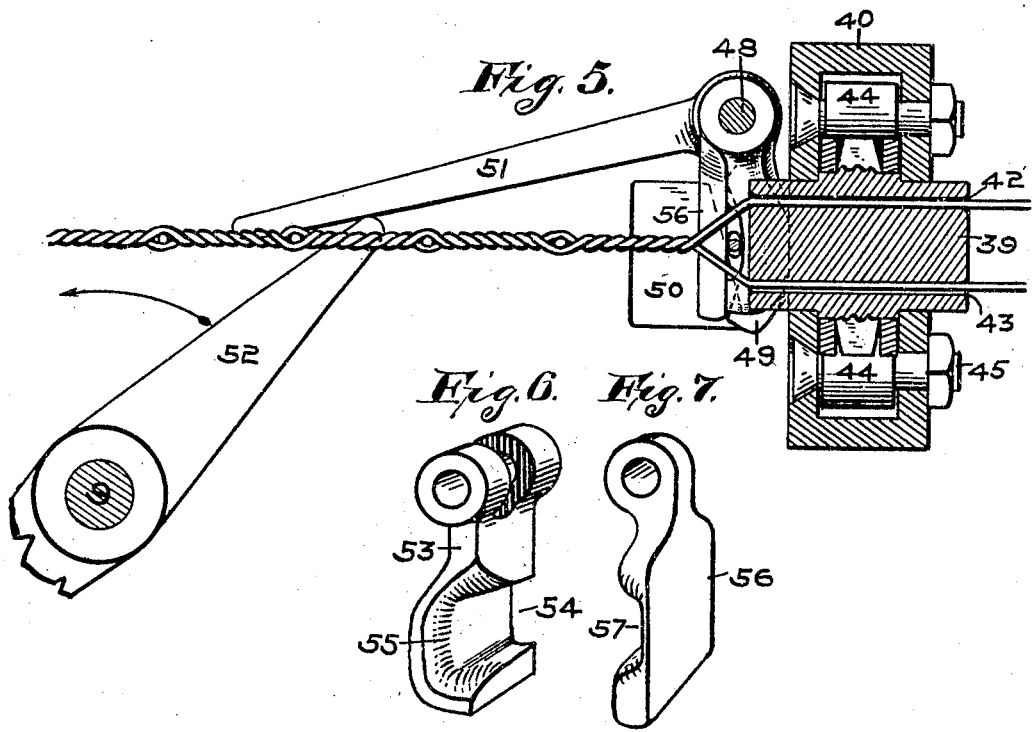

UNITED STATES PATENT OFFICE.

GEORGE W. WHITTINGTON, OF INDIANAPOLIS, INDIANA, ASSIGNOR OF ONE-HALF TO GEORGE P. A. WEISENBORN, OF INDIANAPOLIS, INDIANA.

FENCE-WEAVING MACHINE.

No. 801,950.　　　Specification of Letters Patent.　　　Patented Oct. 17, 1905.

Application filed June 17, 1904. Serial No. 213,016.

*To all whom it may concern:*

Be it known that I, GEORGE W. WHITTINGTON, a citizen of the United States, residing at Indianapolis, in the county of Marion and State of Indiana, have invented certain new and useful Improvements in Fence-Weaving Machines, of which the following is a specification.

This invention relates to improvements in machines for weaving wire fences of a kind having horizontal strands each comprising a pair of wires twisted together and crimped transverse or vertical stays introduced between the two wires forming said strands; and the object of the invention is to render the operation of crimping and cutting off the stays and inserting them and the twisting of the horizontal strands automatic and to provide a durable and simple machine that will produce the above fence rapidly and continuously.

I accomplish the objects of the invention by the mechanism illustrated in the accompanying drawings, in which—

Figure 1 is a top plan view of my invention broken away in part to bring it within the limits of the page; Fig. 2, a vertical longitudinal on the line 2 2 of Fig. 1; Fig. 3, a side elevation of the machine without the roll of fence material such as is shown in the preceding figures; Fig. 4, a detail from the inside of the machine looking toward the twisters at the end where the crimping-disks are located; Fig. 5, a detail in cross-section on the line 5 5 of Fig. 4, and Figs. 6 and 7 are details in perspective of the guides for directing the stays into place between the wires of each horizontal pair.

Like characters of reference indicate like parts throughout the several views of the drawings.

1 is the iron frame, which supports the operative mechanism of the invention. 2 is the main shaft, which has the pulley 3, which is driven by belt from any suitable source of power. It also has the pinions 4, which mesh with the cogs of the large spur-gears 5 on the ends of the shaft 6. The shaft 6 also has the spur-gears 7, which mesh with the gears 8, mounted on the shaft 9 immediately below said shaft 6.

The wheels 5 have bevel-cogs 10 extending half-way around on the outer side, and on a smaller concentric circle the semi-annular tables 11, to engage wings 12 on the bevel-pinions 13 and hold the latter from rotation after they leave the bevel-cogs 10. An intermittent movement is thus transmitted to the shafts 14, on which the pinions 13 are mounted. This intermittent movement is transmitted, through gears 15 16, to the shafts 17, on which the corrugated disk 18 is mounted. Integral with said disk is the spur-gear 19, which meshes with gear 20 on the shaft 21 below. Integral with the gear 20 is the corrugated disk 22. The disks 18 and 22 work together to form feeders and crimpers, which simultaneously feed the stay-wire 23 into the machine and crimp it. 24 is a guide for the wire before it is fed to the crimpers.

The wheels 8 have the bevel-cogs 25 extending the quadrant of a circle around their outer sides. At each end of said quadrant are the tables 26 between smaller concentric circles. These also are quadrants. Their purpose is to engage the wings 27 27 on the bevel-pinions 28 28 and prevent the rotation of the latter during the travel over said tables of said wings. The pinions 28 28 are mounted in a fixed manner on the shaft 21, and by the construction just described the shaft is made to revolve intermittently, its rotary period being for one-fourth of each revolution of wheel 8. Mounted on the end of shaft 21 is the spur-gear 30, which engages the pinion 31 on the shaft 32. The latter has the sprocket-wheel 33, which is connected by chain belt 34 with the sprocket-wheel 35 on the shaft 36. Integral with wheel 35 is the sprocket-wheel 37, around which passes chain belt 38, which drives the wire-twisters 39. The latter are as numerous as there are horizontal strands in the proposed fence, and they each comprise a sprocket-wheel with elongated hubs which have bearings in suitable openings in the hollow beam 40. The latter will preferably be in two parts, divided horizontally at the mid-line of the beam, said two parts being secured together by the end bolts 41, (see Fig. 4,) and the sprocket portions of the twisters are located within the hollow interior of the beam with the hubs projecting in the manner clearly shown in Fig. 5. The hubs of the twisters have two holes 42 43, each an equal distance from the twister-axis, for the passage of the respective wires of the horizontal strand to be twisted by that twister. Any looseness of the belt 38, due to wear or other cause, is taken up by the tightener-rollers 44. These are mounted on bolts 45, which have adjustment in vertical slots 46 in the sides of the beam 40. This adjustment is retained by tightening up the nuts on the respective bolts. The wires for the horizontal strands pass to said twisters from suitable reels or carriers (not shown) which are located outside of the machine.

Mounted inside of the beam 40 on suitable brackets 47, supported from the beam and in position above the twisters, is the shaft 48. Mounted on this shaft in a fixed manner is one jaw 49 of a shears which cuts against a plate 50, secured to the frame of the machine, and which forms the other jaw of said shears. The jaw 49 has the integral lever 51, which extends into the path of the cam 52, mounted on and rotating with the shaft 9. Said lever is raised by the cam, so as to shear off the stay-wire and also to rock the shaft 48. Mounted on the shaft 48 between and on each side of each twister and moving with the shaft when the shaft is rocked are the pendent guide-bars 53 of normal thickness, when in lowered position in contact with the beam 40, to intersect the path of the stay; but to prevent interference there the said bars are provided with the transverse grooves 54, which receive the stay and restrain and direct it in its proper course on three sides. The entrances to grooves 54 are expanded, as shown at 55 in Fig. 6, so as to make certain the engagement of any eccentric stay ends and direct them into the restricted grooves. The open side of groove 54 in each bar is closed by a plate 56, also hinged to the shaft 48, but loosely, so as to be freely adjustable. This plate also is provided with a beveled notch 57 at the entrance to the groove in its adjacent bar to direct the stay into said groove. After a stay has been directed into position between the pairs of wires of the several strands it is forced over into the crotches of the forming strands by the movement in that direction of the several bars 53, occasioned by the rocking of shaft 48, as above described. By the continued movement of the fence through the machine as it is completed the stays are drawn away from the bars 53, and the plates 56 being loosely hinged swing up freely, so as to allow the strand to pass without hindrance. Said bars and plates are returned by gravity upon their release. The fence as it is thus woven by the machine is wound upon the reel 58. A drum 59 between the reel and the twisters keeps the fence from sagging at intermediate points and from dragging when the reel is well filled. Mounted on the ends of the reel-shaft are the ratchet-wheels 60, and between said wheels and the frame of the machine are the levers 61, each carrying three pawls 62 to insure more certain engagement with the teeth of said wheels 60. Cranks 63 on shaft 6 are connected by pitmen 64 with the levers 61, so as to move the latter. As a uniform movement of the reel would cause the fence to be drawn through the twisters with an increasing speed as the diameter of the roll increased, thereby causing the distances between the stays to increase proportionately, I provide a compensating device which causes the reel to move enough less distance with the increase in diameter of the reel to keep the rate of travel of the fence from the twisters uniform. This device comprises the roller 65, which rests upon the roll of fence on the reel and is permitted to travel in a circle around shaft 6 by the bars 67, supporting the ends of the roller, which bars are pivoted on shaft 6. The outer ends of the bars 67 are bolted to the parallel bars 68, which latter are also pivotally secured to shaft 6. The bars 68 have the longitudinal slots 69. The wrist-pins 70, carried by the pitmen 64, pass through longitudinal slots 71 in levers 61 and enter the slots 69 in bars 68. This construction causes the wrist-pins 70 to move out on the levers 61 as the diameter of the roll on the reel increases and keeps the rate of travel of the fence through the machine uniform.

By adjusting the bars 67 and 68 with relation to each other the rate of travel of the reel is varied, so as to vary the distance between the stays. This adjustment is secured through the transverse slot 72 and bolt 73.

Having thus fully described my invention, what I claim as new, and wish to secure by Letters Patent, is—

1. In a machine for making wire fencing having horizontal strands of two wires each, twisted together, and transverse stays, intermittently-rotating wire-twisters through which the wire pairs for each strand are passed, a reel upon which the finished fence is wound, and automatic means for feeding a stay-wire transversely of the horizontal wires between the pairs of each strand and a rock-shaft having guides to direct the stay between the strands and a shear-blade to cut it off at the required length.

2. In a machine for making wire fencing having horizontal strands of two wires each, twisted together, and transverse stays, intermittently-rotating wire-twisters through which the wire pairs for each strand are passed, a reel upon which the finished fence is wound, automatic means for operating the reel so as to lessen its speed as the diameter of the roll increases and automatic means for feeding a stay-wire transversely of the horizontal wires between the pairs of each strand at each rest period of the twisters, a rock-shaft having guide-bars between each pair of twisters, said bars having forwardly-expanding grooves, and said shaft having a shear-blade for severing the stay.

3. In a machine for making wire fencing having horizontal strands of two wires each, twisted together, and transverse stays, intermittently-rotating wire-twisters through which the wire pairs for each strand are passed, a reel upon which the finished fence is wound, automatic means for operating the reel so as to lessen its speed proportionately as the diameter of the roll increases, automatic means for feeding a stay-wire transversely of the horizontal wires between the pairs of each strand at each rest period of the twisters, a rocking shaft having guides to direct the stays between said pairs and move them into their crotches and means for severing the strands at their proper lengths.

4. In a machine for making wire fencing of the kind specified, intermittently-rotating wire-twisters through which the wire pairs for each strand are passed, a reel upon which the finished fence is wound, automatic means for operating the reel so as to lessen its speed proportionately as the diameter of the roll increases, automatic means for feeding a stay-wire transversely of the horizontal wires between the pairs of each strand at each rest period of the twisters, guide-bars pivoted at their upper end and bearing against the twister-beam on each side of the twisters to direct the stays between said pairs, means for corrugating said stays as they are fed in and means for cutting them off at the right lengths.

5. In a machine for making wire fencing of the kind specified, intermittently-rotating wire-twisters through which the wire pairs for each strand are passed, a reel upon which the finished fence is wound, automatic means for operating the reel so as to lessen its travel proportionately as the diameter of the roll increases, automatic means for feeding a stay-wire transversely of the horizontal wires between the pairs of each strand at each rest period of the twisters, corrugating-disks between which said stays are fed and corrugated, guides between the twisters to direct the stays between the pairs of said strands said guides having forwardly-expanding grooves to receive the wires and means for cutting the stays off at the required lengths.

6. In a machine for making wire fencing of the kind specified, a hollow beam, twisters located therein through which the wire pairs of each respective strand are passed, means for intermittently rotating the twisters in alternate opposite directions, a pair of corrugated disks rolling together to corrugate a stay-wire and feed it into the machine a rod transverse to and above the twisters, and guide-bars pendent therefrom between the twisters to guide the stay-wire between the untwisted pairs of the fence-stays.

7. In a machine for making wire fencing of the kind specified, a hollow beam, twisters located therein through which the wire pairs of each respective strand are passed, means for intermittently rotating the twisters in alternate opposite directions, a pair of corrugated disks rolling together to corrugate a stay-wire and feed it into the machine, a rock-shaft having guide-bars between the twisters to guide the stay-wire between the untwisted pairs of the fence-stays, and to force the stay into the crotch of said pairs before the next twist is made and a shears to cut off the stay.

8. In a machine for making wire fencing of the kind specified, a hollow beam, twisters located therein having hubs which are journaled in openings through the sides of said beam said hubs having a pair of perforations parallel with the hub-axis but at opposite sides thereof, through which the wire pairs of the respective fence-strands are passed, means for intermittently rotating the twisters in alternate opposite directions, a pair of corrugated disks rolling together intermittently to crimp and feed a stay-wire into the machine during the rest periods of the twisters, and a rock-shaft mounted parallel with said beam and having guide-bars to direct the stays into position between the wire pairs of the several strands and then push them into the crotches of the pairs, and said shaft having a shears to cut off the stay.

9. In a machine for making wire fencing of the kind specified, a hollow beam, twisters located therein through which the wire pairs of each respective strand are passed, means for intermittently rotating the twisters, means to crimp and feed a wire stay between the wire pairs of the respective strands at the rest periods of the twisters, a rocking shaft having guide-bars between the twisters to direct the stays and afterward move them into the crotches of the pairs before the next twist.

10. In a machine for making wire fencing of the kind specified, intermittently-rotating wire-twisters through which the wire pairs of each respective strand are passed, means to crimp and feed a wire stay between the wire pairs of the respective strands at the rest periods of the twisters, a rocking shaft having guide-bars depending between the twisters to direct the stays and afterward move them into the crotches of the pairs before the next twist, and plates hinged to said shaft and hanging loosely against the guide-bars.

11. In a machine for making wire fencing of the kind specified, a beam having perforations in its walls in which the hubs of twisters are mounted, said twisters having sprocket-teeth, a link belt connecting said sprockets, adjustable tightening-rollers between the twisters, means for intermittently moving the belt in alternate opposite directions, means to draw the fence through the machine as it is made and reel it up and means to crimp and feed a stay-wire between the wire pairs of the respective strands.

In witness whereof I have hereunto set my hand and seal, at Indianapolis, Indiana, this 6th day of May, A. D. 1904.

GEORGE W. WHITTINGTON. [L. S.]

Witnesses:
GEO. P. A. WEISENBORN,
JOSEPH A. MINTURN.